(12) United States Patent
Fukumoto

(10) Patent No.: US 6,272,963 B1
(45) Date of Patent: Aug. 14, 2001

(54) BLADE MATERIAL FOR METALLIC BAND SAW AND METALLIC BAND SAW MADE THEREFROM

(75) Inventor: Shiho Fukumoto, Yasugi (JP)

(73) Assignee: Hitachi Metals, Ltd., Tokyo (JP)

(*) Notice: Subject to any disclaimer, the term of this patent is extended or adjusted under 35 U.S.C. 154(b) by 0 days.

(21) Appl. No.: 09/371,500

(22) Filed: Aug. 10, 1999

(30) Foreign Application Priority Data

Jan. 28, 1999 (JP) .................................................. 11-019747

(51) Int. Cl.⁷ .................................................. B23D 53/00
(52) U.S. Cl. .............................. 83/788; 83/661; 420/101; 420/102; 420/113; 420/111
(58) Field of Search ..................... 83/788, 661; 420/101, 420/113, 111, 102

(56) References Cited

U.S. PATENT DOCUMENTS

| | | | | |
|---|---|---|---|---|
| 1,729,154 | * | 9/1929 | Clawson ................................ | 420/101 |
| 1,876,411 | * | 9/1932 | Gregg et al. ........................ | 420/101 |
| 2,183,014 | * | 12/1939 | Emmons et al. ..................... | 420/101 |
| 2,809,109 | * | 10/1957 | Field ..................................... | 75/129 |
| 3,704,115 | * | 11/1972 | Wastenson et al. ............. | 75/0.5 BC |
| 4,036,640 | | 7/1977 | Philip et al. . | |
| 4,116,684 | * | 9/1978 | Uchida et al. ....................... | 75/126 |
| 4,140,524 | * | 2/1979 | Oberholtzer et al. .............. | 75/123 |
| 4,318,733 | * | 3/1982 | Ray et al. ............................. | 75/126 |
| 4,358,317 | * | 11/1982 | Abe .................................. | 75/126 C |
| 4,469,514 | * | 9/1984 | Holtz, Jr. ............................. | 75/236 |
| 5,032,356 | * | 7/1991 | Kumagai et al. ................... | 420/111 |
| 5,061,441 | * | 10/1991 | Aoki et al. .......................... | 420/109 |
| 5,160,553 | * | 11/1992 | Leban et al. ........................ | 420/101 |
| 5,651,842 | * | 7/1997 | Nakamura et al. ................ | 420/101 |

FOREIGN PATENT DOCUMENTS

| | | |
|---|---|---|
| 62-294152 | 12/1987 | (JP) . |
| 1-201442 | 8/1989 | (JP) . |
| 9-279306 | 10/1997 | (JP) . |

\* cited by examiner

Primary Examiner—Rinaldi I. Rada
Assistant Examiner—Omar Flores-Sánchez
(74) Attorney, Agent, or Firm—Sughrue, Mion, Zinn, Macpeak & Seas, PLLC

(57) ABSTRACT

A metal band saw is disclosed which is used to cut cutting-resistant materials such as SKD11, stainless steel, etc. and has characteristics of generating less chips on the cutting edge as well as improving wear resistance, resulting in very long service life. The blade material for the metallic band saw comprises high-speed steel containing 2 wt. % or less of vanadium (V), wherein 3 area % or more of carbide grains having a major diameter of 3 $\mu$m or more as observed in a metallographic structure.

8 Claims, 3 Drawing Sheets

BLADE MATERIAL FOR METALLIC BAND SAW AND METALLIC BAND SAW MADE THEREFROM

BACKGROUND OF THE INVENTION

1. Field of the Invention

The present invention relates to a blade material for a metallic band saw which is used for cutting metallic materials and like materials, and more particularly to a blade material comprising high-speed steel and used for a metallic band saw having a body material and a blade material joined in parallel to the body material; and to a metallic band saw made therefrom.

2. Description of the Related Art

Most metallic band saws used for cutting metallic materials and like materials are constructed of a body material exhibiting toughness and a blade material comprising, for example, high-speed steel exhibiting high hardness, wherein the blade material is joined in parallel to the body material. Blade materials for such a metallic band saw include SKH59 (equivalent to AISI M42, DIN W Nr 13247, SS SWEDEN 2716 and AFNOR HS2-9-1-8 Z110DKCWV09-08-04-02-01) and SKH51 (equivalent to AISI M2, DIN W Nr 13343, SS SWEDEN 2722 and AFNOR HS6-5-2 Z85WDCV06-05-04-02). SKH59 is mainly used to cut cutting-resistant materials such as SKD11 (equivalent to AISI D2, DIN 12379, SS SWEDEN 2310 and AFNOR X160CrMoV12 Z160CDV12) and stainless steel, and SKH51 is used for cutting, for example, structural steel. As compared with SKH51, SKH59 contains an additive of Co, and in addition, a slightly greater amount of a W equivalent (W+2Mo), to thereby attain enhanced heat resistance and wear resistance, and finds use in cutting cutting-resistant materials. However, the cutting edge of a metallic band saw made of SKH59 undergoes considerable wear when used to cut cutting-resistant materials, and thus is not completely satisfactory.

In order to reduce wear of the cutting edge, a V-rich high-speed steel has been used as a blade material. Although addition of a large amount of V (vanadium) provides reduced wear of the cutting edge, it sometimes leads to chipping of the cutting edge, thereby limiting the service life of the blade.

Chipping of a cutting edge has been elucidated to be caused by hard and large carbide grains precipitated in the blade material. Particularly, a high V content permits formation of hard and large carbide grains, and due to the attendant reduction of C content in the matrix, hardness of the matrix decreases to thereby simultaneously cause deterioration in wear resistance of the matrix.

SUMMARY OF THE INVENTION

Accordingly, an object of the present invention is to provide a blade material for a metallic band saw, which blade material exhibits chipping resistance and excellent wear resistance.

The blade material of the present invention comprises high-speed steel containing carbide grains having a major diameter of at least 3 μm and not more than 2 wt. % of vanadium, wherein, in a metallographic observation area, the carbide grains account for at least 3 area %.

Preferably, in a metallographic observation area, the entirety of carbide grains account for 4–18 area %.

Preferably, in a metallographic observation area, carbide grains having a major diameter of at least 3 μm account for not more than 10 area %.

Preferably, the blade material of the present invention is a high-speed steel having the following composition by weight: W equivalent (W+2Mo): 20 wt. % or more, Cr: 3–6 wt. %, V: 2 wt. % or less, Si: 2 wt. % or less, Mn: 2 wt. % or less, and C: 1–1.4 wt. %, with the remainder being substantially Fe.

Further, when Co is contained in the blade material of the present invention, the W content, the sum of the W equivalent and the Co content, and the V content are preferably 1% or more, 20–33%, and 1–2% inclusive, respectively.

DETAILED DESCRIPTION OF THE PREFERRED EMBODIMENTS

Figure 1:
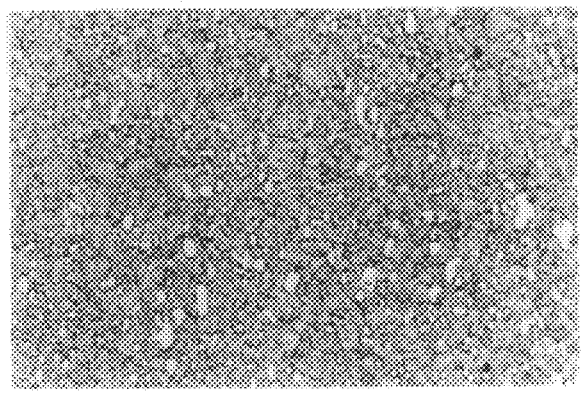
FIGS. 1 and 2 are photographs showing metallographic micro-structures of steels of the present invention.

A primary advantage of the present invention is excellent prolongation of service life of a metallic band saw, and this has been attained by restricting the V content to not more than 2% in a metallic band saw blade material comprising high-speed steel, and simultaneously by increasing the size of carbide grains existing in the metallographic structure.

When high-speed steel having an increased V content is used as a blade material of a metallic band saw, there arises a problem of chipping of the cutting edge. To prevent chipping, V content should be suppressed. However, when the V content is reduced, wear resistance of the cutting edge is significantly deteriorated. The present inventor has solved this dilemma by increasing the size of carbide grains in the metallographic structure while reducing the V content, and has attained a cutting edge of increased wear resistance without reliance on VC carbide.

In the present invention, V content is restricted to no more than 2%, because when V content is in excess of 2%, large VC grains exist and therefore chipping of the cutting edge occurs, resulting in shortening of the service life.

In the present invention, the carbide grains are large, as defined such that carbide grains having a major diameter of 3 μm or more account for 3 area % or more of the metallographic structure. The major diameter of 3 μm is critical, because a carbide size less than 3 μm does not provide an effect of prolonging service life.

In order to obtain a metallographic structure containing the above-described specific carbides, the most important factor is selection of the composition, although manufacturing conditions for the material such as conditions for casting, forging, working, etc., also have an influence.

Hereafter, alloy compositions suitable for the metallic band saw of the present invention will be described.

The composition of the high-speed steel used for a blade material for the metallic band saw of the present invention is as follows (% refers to % by weight): W equivalent (W+2Mo): 20% or more, Cr: 3–6%, V: 2% or less, Si: 2% or less, Mn: 2% or less, and C: 1–1.4%, with the remainder being substantially Fe. Co may be contained and when Co is contained, the sum of the W equivalent and the Co content is 20–33%. Preferably, W content is 1% or more and V content is 1% or more.

W or Mo is an essential element for increasing hardness of the blade material. When W equivalent is less than 20%, the amount of hard carbides precipitated after quenching is reduced, resulting in poor wear resistance. When total of W equivalent and Co content is less than 20%, the amount of hard carbides precipitated after quenching is also reduced, resulting in poor wear resistance.

On the other hand, when total of W equivalent and Co content is in excess of 33%, precipitation of hard carbides increases but high hardness is difficult to achieve because the amount of C forming a solid solution in the matrix decreases, resulting in poor wear resistance. Also, productivity is considerably deteriorated.

When W content is less than 1%, crystal grains in the matrix become large at the quenching temperature and toughness is decreased, resulting in the tendency for chipping of the cutting edge. Also, excessive solid solution of carbon (C) tends to be caused in the matrix and toughness is decreased. Therefore, W content is preferably not less than 1%.

Co is not an essential element in the present invention, but Co content is preferably not less than 5%. When Co content is not less than 5%, hardness of the blade material is increased, resulting in improved wear resistance.

V is a basic element as mentioned above. Combination of V and C produces precipitation of a hard VC compound and therefore increases hardness of the blade material, resulting in improving wear resistance of the blade material. However, when the V content is over 2%, VC crystallizes as a primary crystal and C is present as VC instead of as a solid solution in the matrix, resulting in poor hardness of the matrix. Further, when VC crystallizes as a primary crystal, the crystal grows, resulting in low toughness.

On the other hand, when V content is not more than 2%, VC does not crystallize as a primary crystal and $M_2C$ carbide crystallizes. The $M_2C$ compound has a characteristic of decomposing into microscopic MC or $M_6C$ under hot working. When the W equivalent is high, as in the present invention, $M_2C$ content increases and therefore $M_6C$ is stabilized. The $M_6C$ compound has a major diameter of 3 $\mu$m or more and improves cutting performance.

When V content is less than 1%, V is solid-soluble in the matrix and VC does not precipitate, resulting in a decrease in the hardness of the blade material. Therefore, V content is preferably 1% or more.

Cr, Si, Mn, and C are contained in order to attain high hardness and long service life of the blade material. The following contents are preferable; Cr: 3–6%, Si: 2% or less, Mn: 2% or less, and C: 1–1.4%; but specific contents are determined with relation to amounts of other elements.

After a high-speed steel material of the above-described composition is forged, hot working and cold working are carried out to thereby obtain a material of the desired size, and heat treatment is conducted. The heat treatment preferably includes quenching at a temperature of about 40° C. lower than the eutectic temperature, followed by tempering at about 550° C.

In the present invention, service life is further improved when 4–18 area % of total carbides is observed in the metallographic structure. When the entirety of carbides account for less than 4 area % while carbide grains having a major diameter of 3 $\mu$m or more account for 3 area % or more, carbides having a very small size scarcely exist, resulting in easy wearing of the cutting edge. When the entirety of carbides account for over 18 area %, chipping of the cutting edge occurs easily.

In the present invention, carbide grains having a major diameter of not less than 3 $\mu$m preferably account for 10 area % or less in the metallographic structure; in the event where carbide grains grow excessively large, chipping of the cutting edge occurs.

Conventionally proposed materials can be used for the above-mentioned body material bonded to the blade material. Desirably, the body material is band-shaped and holds the blade material and is durable under bending stress and tensile stress applied during use of a metallic band saw, and is economical as well. For this purpose, in the present invention, a steel which has hardness of 53HRC or less after heat treatment is preferable. When a steel having hardness in excess of 53HRC is chosen, the amount of alloy elements must be increased, which is incompatible with the object of using an economical material for the metallic band saw.

For example, there may be used a steel having the following composition (% refers to % by weight); C: not more than 0.6%, Cr: not more than 7%, and carbide-forming elements of Groups 4A, 5A, or 6A other than Cr. e.g., one or more species selected from among W. Mo, V, Nb, and Ti: not more than 3% in total, with the remainder being substantially iron. C content is limited to 0.6% or less, because C is an essential element for maintaining basic hardness and toughness of the steel, but when the C content is in excess of 0.6%, toughness is deteriorated and therefore carbon (C) is preferably used up to a maximum content of 0.6 %.

Cr is used for its contribution to good quenching characteristics of the body material and to high resistance to temper softening due to the formation of Cr carbide through bonding with C. However, addition of chromium (Cr) in an excessive amount conversely deteriorates resistance to temper softening, and therefore Cr content is preferably restricted to 7% or less.

W and Mo, and carbide-forming elements of Groups 4A, 5A, or 6A other than Cr are elements used for their contribution to high wear resistance of the body material and are also effective for ensuring hardness required of the body material and for improving-toughness. However, their excessive addition deteriorates toughness, which is the most important requirement of the body material, and therefore their total content is preferably 3% or less. V, Nb, Ti, etc. are as effective as W and Mo for improving wear resistance of the body material, but are expensive and therefore their total content is restricted to 3% or less.

Si and Mn, which are used as deoxidizers in the production process of steel, may be contained, but when their respective contents are in excess of 2%, toughness is deteriorated. Therefore, their respective contents are preferably 2% or less.

JIS G 4051 S50C (carbon steel) or AISI6150 may also be used as a body material.

EXAMPLES

Steel materials having chemical compositions (wt. %) shown in Table 1 were subjected to ingot-making, and forged into bars having a diameter of 15 mm, within a temperature range of 1000–1200° C., followed by warm working and cold working to thereby obtain samples having a cross-sectional size of 1 mm×2 mm. In Table 1, sample Nos. 1–8 are examples of the present invention and samples.

Figure 2:
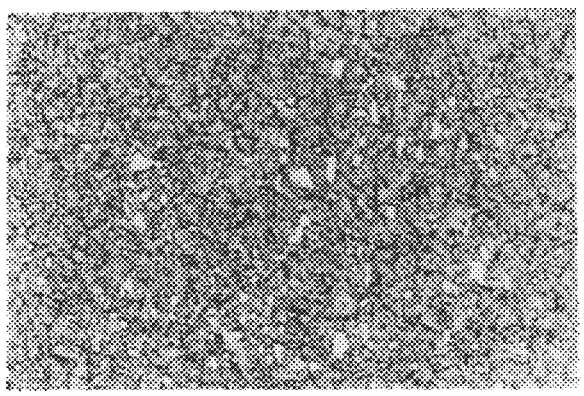
Figure 3:
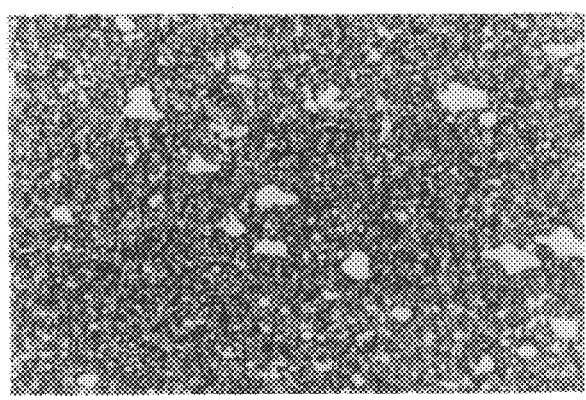
FIG. 3 is a photograph showing a metallographic microstructure of a comparative steel.

C1–C7 are comparative examples. Comparative Example C1 corresponds to SKH59 and Comparative Example C2 corresponds to SKH51. These materials were subjected to quenching at a temperature of about 40° C. lower than tie eutectic temperature and to tempering at 550° C. Subsequently, hardness HRC was measured and metallographic structure was observed. The results are shown in Table 2, including hardness, total carbide content (area %), and content of carbide grains having a major diameter of 3 μm or more (area %). FIGS. 1, 2, and 3 are photographs of a metallographic structure of 400 magnifications showing Example Nos. 1 and 8 according to the present invention and Comparative Example C6, respectively.

TABLE 1

| No. | C | Si | Mn | Cr | W | Mo | V | Co | Fe |
|---|---|---|---|---|---|---|---|---|---|
| Steels of the present invention ||||||||||
| 1 | 1.17 | 0.24 | 0.30 | 4.21 | 6.96 | 7.45 | 1.56 | 8.10 | Bal. |
| 2 | 1.22 | 0.56 | 0.34 | 4.54 | 1.98 | 9.69 | 1.65 | 8.21 | Bal. |
| 3 | 1.10 | 0.43 | 0.43 | 4.29 | 7.21 | 7.42 | 1.46 | — | Bal. |
| 4 | 1.17 | 0.53 | 0.32 | 3.94 | 2.01 | 9.87 | 1.59 | — | Bal. |
| 5 | 1.15 | 0.34 | 0.26 | 4.17 | 7.13 | 7.57 | 1.53 | 5.34 | Bal. |
| 6 | 1.19 | 0.49 | 0.24 | 3.97 | 2.06 | 10.12 | 1.71 | 5.29 | Bal. |
| 7 | 1.08 | 0.35 | 0.32 | 4.34 | 18.10 | 2.14 | 1.95 | 8.31 | Bal. |
| 8 | 1.14 | 0.35 | 0.33 | 4.44 | 17.85 | 1.65 | 1.76 | — | Bal. |
| Comparative Examples ||||||||||
| C1 | 1.05 | 0.34 | 0.32 | 4.13 | 1.62 | 9.75 | 1.13 | 8.34 | Bal. |
| C2 | 0.99 | 0.23 | 0.39 | 4.23 | 1.89 | 8.65 | 2.08 | — | Bal. |
| C3 | 0.87 | 0.19 | 0.43 | 3.98 | 6.23 | 5.35 | 1.88 | — | Bal. |
| C4 | 1.26 | 0.34 | 0.27 | 4.31 | 6.14 | 5.29 | 2.89 | — | Bal. |
| C5 | 1.51 | 0.23 | 0.43 | 4.21 | 12.10 | 0.95 | 4.72 | 5.33 | Bal. |
| C6 | 1.27 | 0.34 | 0.33 | 3.95 | 9.73 | 3.51 | 3.36 | 10.51 | Bal. |
| C7 | 1.53 | 0.29 | 0.26 | 4.25 | 6.45 | 3.31 | 5.12 | 4.78 | Bal. |

Bal.: balance quenching and tempering to thereby obtain a metallic band saw blade having a size of 1 mm×45 mm×4500 mm. The composition by weight of the body material was as follows; C: 0.53, Si: 0.40, Mn: 1.12, Ni: 0.68, Cr: 5.18, W: 0.89, Mo: 0.56, V: 0.09, Al: 0.0073, N: 0.033, and Fe: balance, and hardness was HRC 52.1. This band saw blade was subjected to a cutting test in which SKD11 material having a diameter of 100 mm and a hardness of HB180 was cut under the following conditions: wet cutting; a cutting speed of 20/min; and a metal removal rate of 20 cm$^2$/min.

Figure 4:
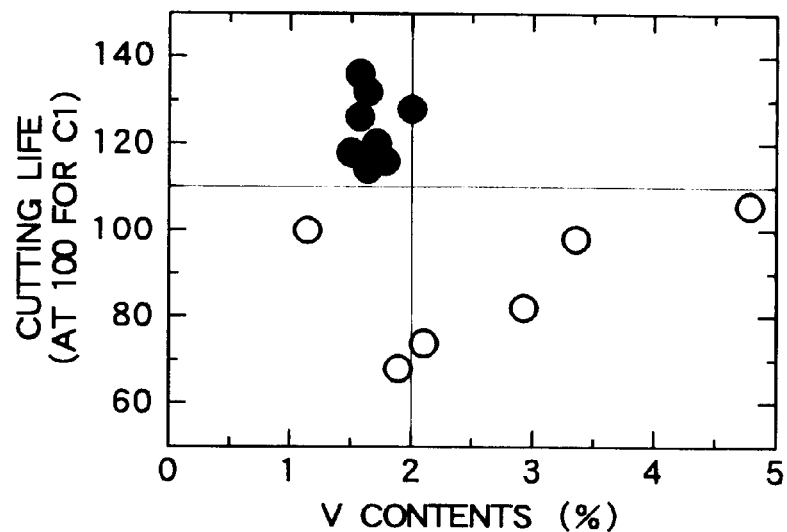
FIG. 4 is a graph showing the service life of a metallic band saw versus V content (%)
Figure 5:
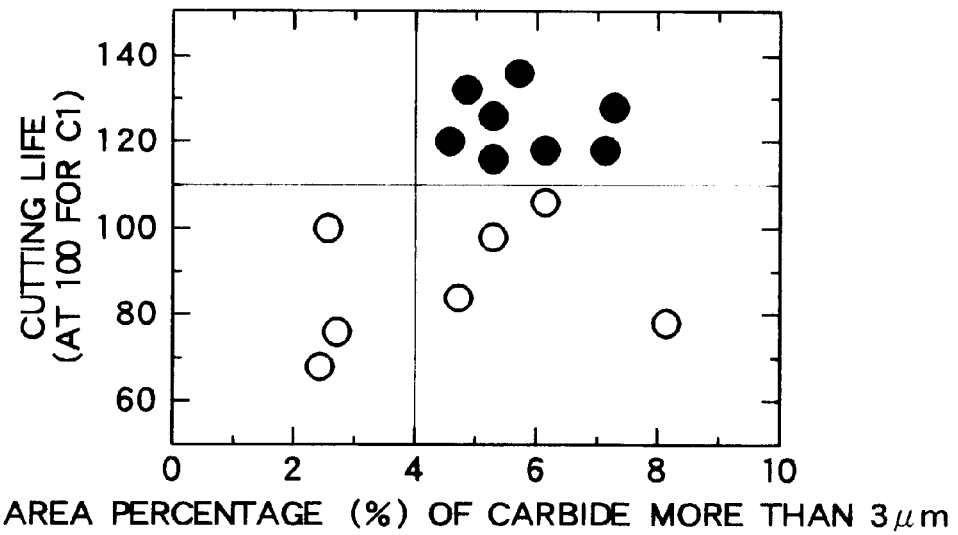
FIG. 5 is a graph showing the service life of a metallic band saw versus carbide grains (area %) having a major axis of 3 μm or more.
Figure 6:
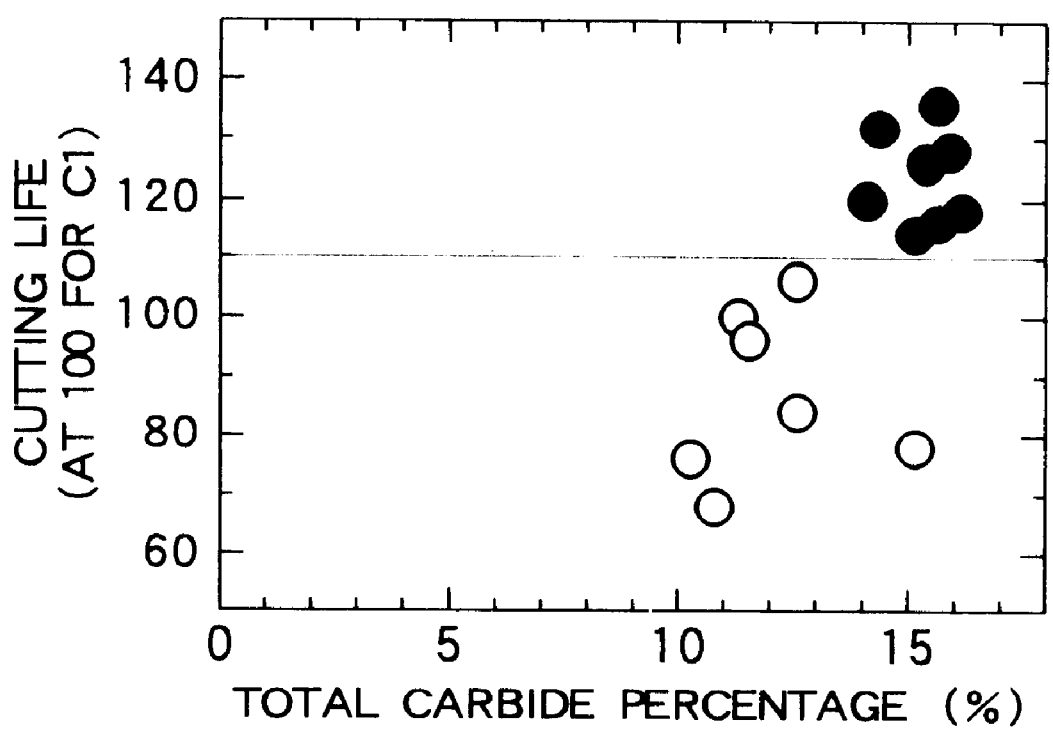
FIG. 6 is a graph showing the service life of a metallic band saw versus the entire amount of carbide (area %).

Table 2 shows the results of the cutting test, in terms of service life and the cause of failure. Service life is normalized with respect to the service life of Comparative Example C1 (SKH59), which is regarded as 100. Also, FIG. 4 shows correlation between service life determined from the cutting test and V content (%); FIG. 5 shows correlation between service life and content of carbide grains having a size of not less than 3 μm (area %); and FIG. 6 shows correlation between service life and total carbide content (area %). In these graphs, the steels of the present invention are plotted as black dots and the comparative steels are plotted as white dots. As shown in Table 2 and FIG. 6, no simple correlation exists between carbide content and service life.

As is clearly shown in these Figures and Table 2, Example Nos. 1–8 have V contents of 2% by weight or less and service lives longer than that of Comparative Example C1 (SKH59). Especially, Example Nos. 1, 2, and 5–7, which contain a large amount of Co, have excellent service life; i.e., 120% of that of Comparative Example C1. Further, none of the Examples of the present invention generated chips on the cutting edge, and failure occurred due to wear on the cutting edge. In contrast, Comparative Examples C4–C7 contain more than 2% of vanadium (V) and all generated chips on their cutting edges. Comparative Example C2 contains more than 2% of vanadium (V) but no chips were observed on the cutting edge. The reason for this is considered that fast wear of the cutting edge resulting in rapid failure and therefore no chips on a cutting edge were observed.

TABLE 2

| No. | Quenching temperature (° C.) | Hardness HRC | Total carbide (area %) | Carbide grains of 3 μm or more (area %) | Cutting service life | Cause of failure |
|---|---|---|---|---|---|---|
| Steels of the present invention |||||||
| 1 | 1180 | 69.1 | 15.9 | 5.7 | 136 | wear of cutting edge |
| 2 | 1170 | 69.4 | 14.5 | 4.8 | 131 | " |
| 3 | 1180 | 67.4 | 16.3 | 6.2 | 117 | " |
| 4 | 1180 | 67.2 | 15.6 | 5.3 | 114 | " |
| 5 | 1180 | 68.2 | 15.5 | 5.3 | 126 | " |
| 6 | 1170 | 68.1 | 14.4 | 4.5 | 120 | " |
| 7 | 1230 | 67.5 | 16.1 | 7.3 | 127 | " |
| 8 | 1230 | 66.4 | 15.9 | 7.1 | 116 | " |
| Comparative Examples |||||||
| C1 | 1170 | 68.5 | 11.5 | 2.5 | 100 | " |
| C2 | 1180 | 66.4 | 10.5 | 2.7 | 75 | " |
| C3 | 1200 | 65.4 | 10.8 | 2.4 | 68 | " |
| C4 | 1190 | 64.8 | 12.8 | 4.7 | 83 | chipping of edge |
| C5 | 1210 | 66.7 | 12.7 | 6.2 | 106 | " |
| C6 | 1210 | 67.7 | 11.6 | 5.2 | 97 | " |
| C7 | 1210 | 65.3 | 15.2 | 8.1 | 78 | " |

In FIGS. 1 and 2 showing microstructures of the steels of the present invention, carbide grains having a size of 3 μm or more disperse homogeneously. In contrast, in FIG. 3 showing microstructure of a comparative steel, large-sized carbide precipitates are observed but the remainder of the precipitates are in the form of microscopic carbide, the large-sized carbide grains being VC.

Each of the above-described high-speed steel samples was joined to a body material by welding, and subjected to When metallographic structure was observed, all the Examples 1–8 exhibited 3 area % or more of carbide grains having a major diameter of 3 μm or more. Comparative Examples C4–C7 also exhibited 3 area % or more of carbide having a major diameter of 3 μm or more, but since these samples have high V content and generated chipping of the cutting edge, the large-sized carbide grains are considered to be VC carbide formed upon primary crystallization.

As is described in detail hereinabove, the metallic band saw blade material of the present invention which is formed of high-speed steel comprising vanadium in an amount of no more than 2 wt. % and having 3 area % or more of carbide grains having a major diameter of 3 μm or more as observed in the metallographic structure is excellent in wear resistance, has an extremely long service life, and tends to generate no chips on the cutting edge, as compared with SKH 59 which conventionally has been widely used for cutting cutting-resistant materials.

What is claimed is:

1. A metallic band saw comprising a band-shaped body material and a blade material made of high-speed steel and welded with the body material, the high-speed steel containing carbide grains having a major diameter of at least 3 μm and not more than 2 wt. % of vanadium, wherein, in a metallographic observation area, the carbide grains account for at least 3 area %.

2. A metallic band saw according to claim 1, wherein, in a metallographic observation area, the entirety of carbide grains account for 4–18 area %.

3. A metallic band saw according to claim 1, wherein the blade material is a high-speed steel having the following composition, where all % are wt. %:

W+Mo: The total of the (a)W%+(b) 2 times the Mo% is 20% or more, and at least one of W and Mo is present;

Cr: 3–6%

V: 2% or less

Si: 2% or less

Mn: 2% or less

C: 1–1.4% the balance being substantially Fe.

4. A metallic band saw according to claim 3, wherein the high-speed steel composition further contains both Co and W, wherein:

the W % is 1% or more;

the sum of (a) the W%+(b) 2 times the Mo%+(c) the Co% is 20–33%; and the V% is 1–2%.

5. A blade material for a metallic band saw, which blade material comprises high-speed steel containing carbide grains having a major diameter of at least 3 μm and not more than 2 wt. % of vanadium, wherein, in a metallographic observation area, the carbide grain, account for at least 3 area %.

6. A blade material according to claim 5, wherein, in a metallographic observation area, the entirety of carbide grains account for 4–18 area %.

7. A blade material according to claim 1, wherein the blade material is a high-speed steel having the following composition, where all % are wt. %:

W+Mo: The total of the (a)W%+(b) 2 times the Mo% is 20% or more, and at least one of W and Mo is present;

Cr: 3–6%

V: 2% or less

Si: 2% or less

Mn: 2% or less

C: 1–1.4% the balance being substantially Fe.

8. A blade material according to claim 7, wherein the high-speed steel composition further contains both Co and W, wherein:

the W% is 1% or more;

the sum of (a) the W%+(b) 2 times the Mo%+(c) the Co% is 20–33%; and the V% is 1–2%.

* * * * *